INVENTOR.
Clarence Wantz.
BY
HIS ATTORNEY

Jan. 22, 1957    C. WANTZ    2,778,419
TIMER CONTROLLED VALVE
Filed Dec. 2, 1952    4 Sheets-Sheet 2

INVENTOR.
Clarence Wantz.
BY
Albert J. Henderson
HIS ATTORNEY

INVENTOR.
Clarence Wantz.
BY
HIS ATTORNEY

Jan. 22, 1957 C. WANTZ 2,778,419
TIMER CONTROLLED VALVE
Filed Dec. 2, 1952 4 Sheets-Sheet 4

INVENTOR.
*Clarence Wantz.*
BY
HIS ATTORNEY

United States Patent Office 2,778,419
Patented Jan. 22, 1957

2,778,419

TIMER CONTROLLED VALVE

Clarence Wantz, Los Angeles, Calif.

Application December 2, 1952, Serial No. 323,686

10 Claims. (Cl. 161—9)

This invention relates generally to control devices for mechanical movements and more particularly to novel latching and tripping mechanisms.

It is a principal object of this invention to control, through mechanical means, a relatively large operating force by the application of a relatively small control force.

Another object of this invention is to utilize a relatively small control force to control a relatively large operating force which may vary in magnitude without affecting the required controlling force.

Another object of this invention is to utilize the friction between coacting detent elements to balance an operating force being controlled, thereby permitting the elements to be moved relative to each other through the application of a relatively small force.

Another object of this invention is to utilize a mechanical escapement mechanism of relatively fragile construction to control relatively large forces.

This invention finds particular utility in the application of escapement type clock movements to the control of elements subjected to relatively heavy loads. In escapement devices, the power available for control purposes is equal to the difference between the power necessary to keep the escapement movement running and the power which causes the escapement movement to overbank. As a result of the allowance of usual manufacturing tolerances, the actual power available in most movements is considerably less than the theoretical power available and in some instances this power is minute. It is an object of this invention to utilize this available power for controlling relatively large operating forces of varying magnitude.

In a preferred embodiment of the invention, a movable operating element frictionally engages a detent element and the operating force is applied to the operating element for transmission to the detent element in such a direction as to produce a component of force substantially equal in magnitude and opposite in direction to the reactive component of force resulting from friction between contacting surfaces of the elements. With such an arrangement, the relatively large operating force will not inhibit relative movement between the operating and detent elements. Thus an extremely small control force may be applied to one of the elements to effect such relative movement and the release of the operating element for uninhibited movement by the operating force.

Other objects and advantages will appear from the following specification taken in connection with the accompanying drawings wherein.

Figure 1:
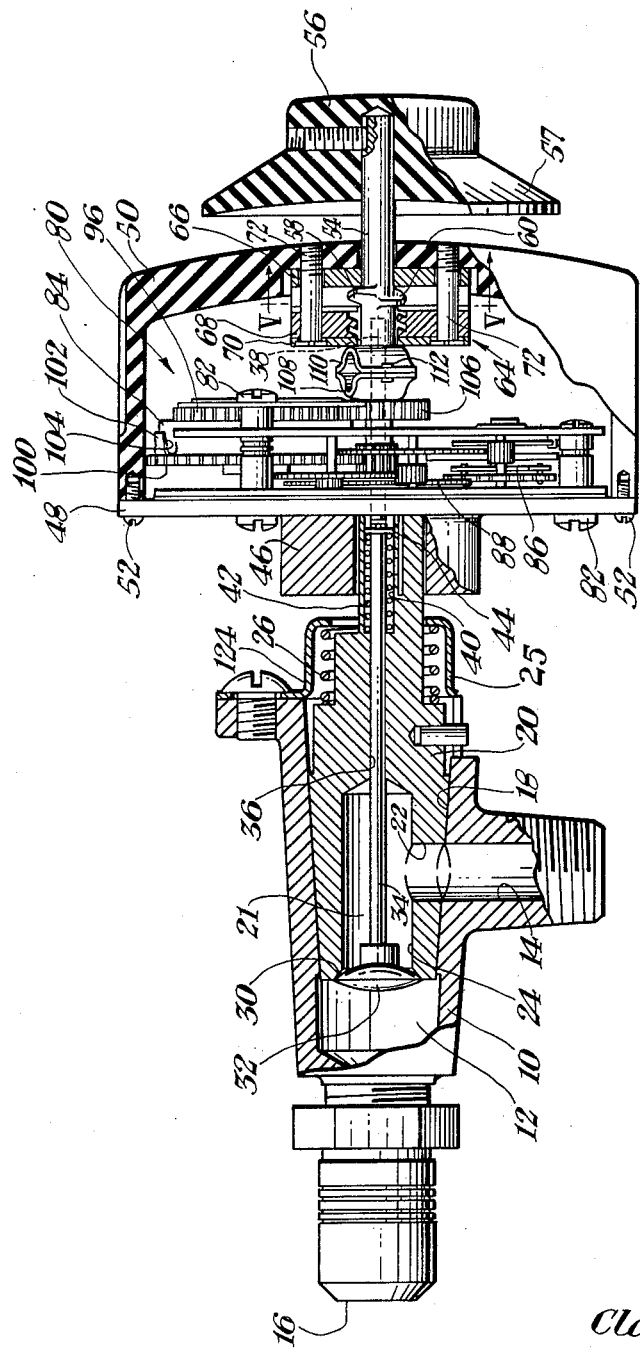
Fig. 1 is a sectional view of a valve device with an actuating mechanism therefor embodying this invention.

Referring more particularly to Figs. 1–7 of the drawings, the control device is shown as applied to a valve of the type utilized to control flow of fuel to fluid fuel burners. The valve comprises a casing 10 provided with a valve chamber 12 which is adapted to be connected to a source (not shown) of fluid fuel through an inlet passage 14 and to a fluid fuel burner (not shown) through an outlet passage 16. A tapered valve seat 18 is formed on the casing 10 in the valve chamber 12 and is engaged by the seating surface of a plug valve member 20.

The plug valve member 20 is provided with an angular passage 21 comprising an axial passage and a communicating radial inlet passage 22 adapted to register with the inlet passage 14 in the casing 10 in one angular position of the plug valve member 20. The angular passage 21 in the plug valve member 20 is also provided with an outlet 24 which communicates with the valve chamber 12 in all positions of the plug valve member 20.

As is customary in gas cocks of this type, rotation of the plug valve member 20 to place the inlet 22 of the angular passage in registry with the casing inlet 14 or with the seating surface of the valve seat 18 will respectively permit or prevent fluid flow to the valve chamber 12 and outlet passage 16.

One end of the plug valve member 20 forms a valve stem which extends out of the casing 10 and which is adapted to receive a handle or knob to be more fully described hereinafter. Acting between the plug valve member 20 and a suitable retainer 25 secured to the casing 10 is a spring 26 which acts to bias the valve member 20 against the tapered seat 18 and insure a fluid-tight seal therebetween.

The wall of the angular passage 21 is chamfered at the outlet end 24 to form an annular valve seat 30. A poppet-type valve member 32 is positioned adjacent the valve seat 30 and is movable into and out of engagement therewith to control fluid flow through the angular passage 21 in the valve member 20. The valve member 32 is mounted on one end of a valve stem 34 which extends through an axial bore 36 formed in the plug valve member 20, the other end 38 of the valve stem 34 extending out of the plug valve member 20.

Bottomed in a counterbore 40 formed in the plug valve member 20 coaxial with the bore 36, is a spring 42 which bears against a collar 44 secured to the valve stem 34 to bias the valve member 32 toward the valve seat 30.

Means is provided for operating the plug valve member 20 between open and closed positions. This means is here shown as comprising a manually operable unit having a hub 46 secured to the end of the plug valve member which extends from the casing 10. A radially extending flange 48 is formed on the hub 46 and a cup-shaped housing 50 is secured to the flange 48 by any suitable means such as screws 52. The housing 50 thus constitutes a knob which may be manually manipulated to rotate the plug valve member between open and closed positions, rotation of the housing 50 being effective to rotate the plug valve member 20 and move the inlet 22 of the angular passage 21 in the plug valve member 20 into and out of registry with the inlet passage 14 formed in the casing 10.

Means for moving the valve member 32 relative to the valve seat 30 is provided and is here shown as including a movable element operatively connected to the valve stem 34. The movable element comprises a shaft 54 which extends slidably through the housing 50 and is recessed at one end to loosely receive the end 38 of the valve stem 34. The shaft 54 is free to rotate and move axially relative to the housing 50 and secured to the end of the shaft 54 which extends out of the housing 50 is a manually operable knob 56 for imparting such movements to the shaft 54. The spring 42 biases the valve stem 34 into engagement with the shaft 54 to urge the same out of the housing 50 and the shaft 54 may be moved against such bias to move the valve member 32 away from the valve seat by manual manipulation of the knob 56. Suitable indicia 57 indicating units of time are imprinted on the edge of the knob for registry with a reference mark 59 on the housing 50 for a purpose which will more fully appear hereinafter.

Formed on the medial portion of the shaft 54 is a pair of oppositely disposed half turns 58, 60 of a double external thread. The threads 58, 60 are milled or ground off at 62 to form a substantially rectangular cross section at the threads for a purpose which will more fully appear.

A relatively stationary detent member is engageable with the shaft 54 for preventing movement thereof and comprises a nut assembly 64 secured to the inside of the housing 50. The nut assembly 64 is made up of three axially bored elements 66, 68, and 70 coaxially arranged and secured to the housing 50 by screws 72. Formed in the contiguous faces of the elements 66, 68 are registering recesses 74, 76 of generally rectangular cross section which are adapted to slidably receive the milled threads 58, 60.

A double internal thread 78 is formed in the axial bore of the element 68, the pitch of the internal threads 78 being the same as the pitch of the threads 58, 60 formed on the shaft 54. The depth of the recess 76 is such that the full width of the thread cavity of the internal thread 78 forms an opening in the wall thereof. The shaft 54 fits snugly in the axial bores of the elements 66, 70 so that axial movement of the shaft 54 is limited by engagement of the threads 58, 60 with the elements 66, 70.

The length of the valve stem 34 is such that when the threads 58, 60 on the shaft 54 are positioned within the recess 74 formed in the element 66, the spring 42 will hold the valve element 32 in its biased or closed position in engagement with the valve seat 30. However, when the shaft 54 is moved axially to move the threads 58, 60 formed thereon into engagement with the internal threads 78 formed in the element 68, the valve stem 34 is moved against the bias of the spring 42 to space the valve element 32 from the valve seat 30, thereby permitting fuel flow through the angular passage 21 in the plug valve member 20. If the shaft 54 is rotated after it has moved the valve element 32 to open position, the external threads 58, 60 will become interengaged with the internal threads 78 and the valve element 32 will be retained in its open position.

It will be apparent that the axial thrust exerted on the valve stem 34 by the spring 42 will be transmitted directly to the shaft 54 and to the threads 58, 60 thereon. Since the bearing surfaces of the threads 58, 60 are disposed at an angle to the line of action of this force, a portion of the force will be transformed to torque and will tend to unscrew the shaft 54 from the element 68. However, the internal threads 78 will exert a reactive force on the threads 58, 60, a portion of which will comprise a torsional component acting in a direction to resist such unscrewing action in the shaft 54.

It is an important feature of this invention that the coacting surfaces of the relatively movable shaft element 54 and the relatively stationary detent element 64 be so arranged that the operating force acting upon the movable member 54 will produce a component of force substantially equal in magnitude and opposite in direction to the reactive component of force resulting from friction between such surfaces regardless of the magnitude of the operating force. With such an arrangement, an extremely small force may be utilized to disengage the movable element 54 from the stationary or detent element 64.

Figure 7:
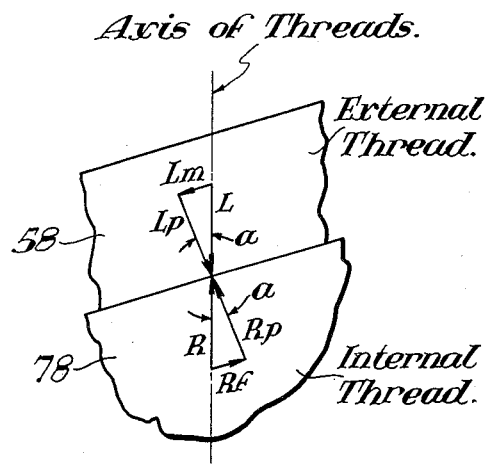
Fig. 7 is a fragmentary view on a greatly enlarged scale of a portion of the device shown in Fig. 1 with a vector diagram superimposed thereon.

This principle may be more fully explained by reference to Fig. 7 which shows contacting portions of the external thread 58 and internal thread 78 with a vector diagram of the forces involved superimposed thereon. In the vector diagram, the vector L represents the axial thrust on the shaft 54 exerted by the spring 42 when the threads 58, 60, 78 are in engagement with each other. This force acts along the common axis of the valve stem 34 and the shaft 54 and produces a reactive force exerted by the internal threads 78, such reactive force being equal in magnitude and opposite in direction to the operating force of the spring 42. This reaction is represented by the vector R in the vector diagram.

Since the force L does not act normal to the bearing surfaces of the threads 58, 78, it produces a component of force acting parallel to the bearing surfaces of the threads which tends to move the thread 58 relative to the thread 78 and cause the former to be screwed out of the latter. This force is represented by the vector $Lm$ in the vector diagram.

The force L will of course create another component of force acting normal to the bearing surfaces of the threads 57, 78. This component is represented by the vector $Lp$ in the vector diagram.

Since $Lp$ is normal to the bearing surface of the threads and L is parallel with the axis of the threads, the angle $a$ included between these vectors is equal to the helix angle of the screw, the helix angle of a screw being the angle which the bearing surface of a thread makes with a plane perpendicular to the axis of the thread. Thus, the magnitude of the force $Lm$ will equal $Lp$ times the tangent of angle $a$ or the helix angle.

The reactive force exerted by the internal thread 78 may also be resolved into two components parallel and normal to the thread bearing surface respectively. These components are represented in the vector diagram by the vectors $Rf$ and $Rp$ respectively. The force represented by the vector $Rf$ will be the resistive force resulting from friction between the threads 58 and 78 and will be dependent upon the magnitude of the component $Rp$ and the coefficient of friction of the engaging surfaces of the threads 58, 78. The resistive force $Rf$ will resist relative sliding movement between the threads 58, 78.

If $Lm$ and $Rf$ are to always balance each other so that the threads are at the point of impending motion, it will be apparent that $Rf$ must equal $Rp$ times the tangent of angle $a$. But $Rf$ also equals $Rp$ times the coefficient of friction. Thus, if $Rf$ is to equal $Lm$, the tangent of angle $a$ must be equal to the coefficient of friction.

When the force $Lm$ is equal and opposite to the resistive force $Rf$, the threads 58, 60, 78 are in balance with the torsional component $Lm$ exactly balanced by the frictional resistance to movement $Rf$. The pitch of the threads is selected so that the tangent of the helix angle is equal to the coefficient of friction of the thread surfaces and this balanced relationship will therefore be maintained despite variations in the axial load L. With this arrangement, no matter what load, within very wide limits, is placed axially on the shaft 54, only a minute amount of torque need be applied to the shaft 54 to start rotation of the same.

Means is provided for applying a control force to the valve actuating means to effect release of the movable operating member 54 from the detent member 64. This means takes the form of an escapement controlled clock movement 80. The movement 80 is disposed within the housing 50 and carried on the flange 48 by a plurality of screws 82.

Figure 3:
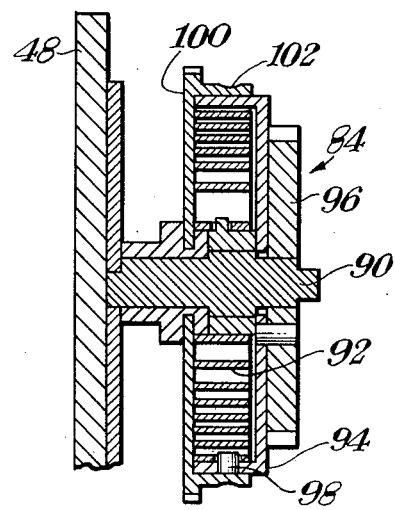
Fig. 3 is a sectional view of a detail.
Figure 5:
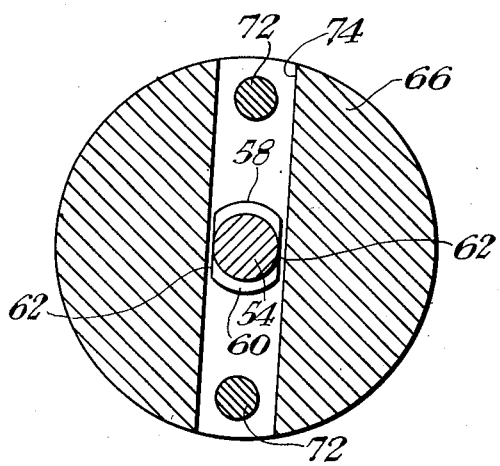
Fig. 5 is a sectional view taken on the line V—V of Fig. 1 and shown on an enlarged scale.
Figure 4:
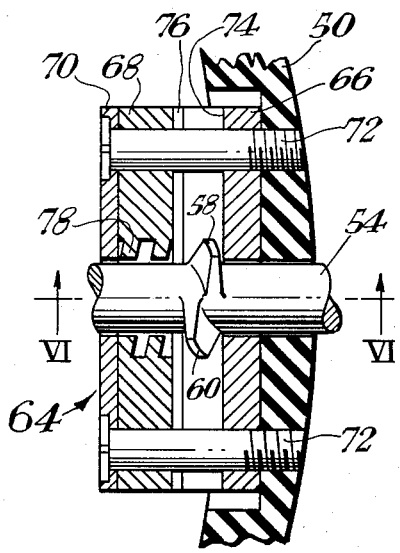
Fig. 4 is a sectional view of a portion of the device shown in Fig. 1 on an enlarged scale.
Figure 6:
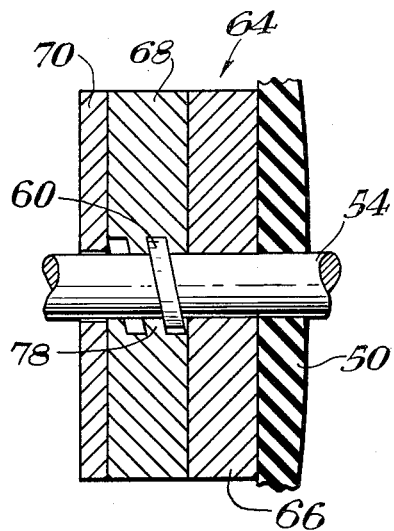
Fig. 6 is a sectional view taken on the line VI—VI of Fig. 4 with the various parts in a different operating position.

The movement 80 includes a main spring assembly 84 geared to an escapement mechanism 86 through a suitable gear train 88. The main spring assembly 84 is best shown in Fig. 3 and comprises a pintle 90 non-rotatably secured to the flange 48 and extending normal to the plane thereof. A spirally wound spring 92 is secured at its inner end to the pintle 90 and lies in a plane substantially parallel to the flange 48. A cup-shaped element 94 encompasses the spring 92 and is carried by a gear wheel 96 rotatably mounted on the pintle 90. The outer end of the spiral spring 92 is secured to the element 94 at 98 so that rotation of the gear 96 and cup-shaped element 94 will vary the tension of the spring 92.

A second gear 100 is rotatably mounted on the pintle 90 and carries an axially extending flange 102 which frictionally engages the cylindrical wall of the cup-shaped element 94. This fit is preferably such that a frictional torque will be developed between the flange 102 and the element 94 which will always be greater than the maximum torque developed by the main spring 92 when the same is completely wound. A plurality of slots 104 (only one of which is shown) may be formed in the flange 102 to facilitate manufacture and avoid the necessity of extremely close tolerances in fitting the flange 102 over the cup-shaped element 94.

The gear 100 meshes with a suitable gear in the gear train 88 and thus is directly connected to the escapement mechanism 86. The gear 96 meshes with a pinion 106 which is loosely mounted on the valve stem 34 and connected to the shaft 54. The connection between the pinion 106 and the shaft 54 is such that the shaft 54 may move axially relative to the pinion 106 while a torque transmitting relation is maintained therebetween. This connection is here shown as comprising a first leaf spring 108 secured at its medial portion to the pinion 106 and a second leaf spring 110 secured at its medial portion to the end of the shaft 54. The juxtaposed ends of the leaf springs 108, 110 are riveted together at 112 so that rotational movement will be transmitted between the pinion 106 and the shaft 54 but, upon axial movement of the shaft 54, the springs 108, 110 will flex causing no axial displacement of the pinion 106.

*Operation*

Assuming that the control device is in the "off" position with the plug valve member 20 and poppet valve member 32 in closed positions, the various parts may be placed in operating condition as follows:

The housing 50 is first manually manipulated to rotate the plug valve member 20 and bring the inlet 22 of the angular passage 21 into registry with the inlet passage 14 of the casing 10. The various parts of the apparatus are then in the position shown in Fig. 1 and fluid may flow from the inlet 14 into the angular passage 21, outflow therefrom being prevented by the valve member 32.

The knob 56 is then depressed to move the shaft 54 axially, carrying the threads 58, 60 out of the recess 74, where rotation thereof is prevented, and into engagement with the internal threads 78. Such movement of the shaft 54 will impart axial movement to the valve stem 34, moving the same against the bias of the spring 42 and positioning the valve element 32 away from the valve seat 30. Fluid may then flow past the valve member 32 to the outlet 16 of the casing 10.

Figure 2:
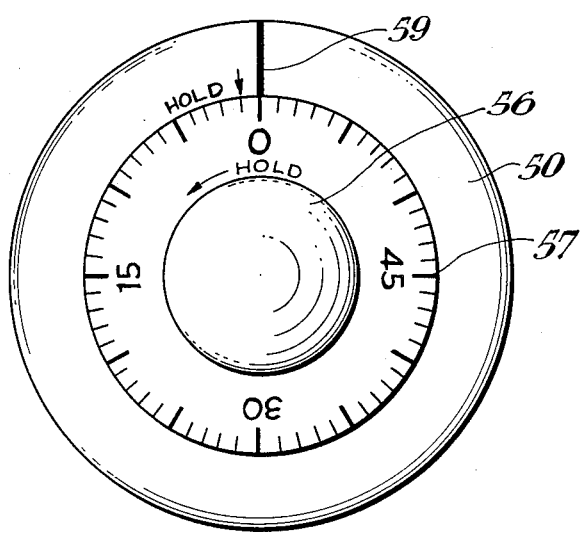
Fig. 2 is an end elevation of the device shown in Fig. 1.

The knob 56 is then rotated in a clockwise direction as viewed in Fig. 2 to a desired time setting indicated by the indicia 57 and reference point 59. Rotational movement of the knob 56 rotates the shaft 54 to screw the threads 58, 60 into the internal threads 78. As hereinbefore pointed out, the pitch of the threads 58, 60, 78 is such that the frictional component of the reactive force acting on the shaft 54 is substantially equal to the torsional component of the force exerted on the shaft 54 by the spring 42. The shaft 54 will therefore remain in the position in which it has been set unless an additional torque is applied thereto to start rotation of the same and screw the threads 58, 60 out of the threads 78.

It will be understood that the sequence of rotational setting movements of the housing 50 and the knob 56 may be reversed if desired with setting of the timer knob 56 preceding operation of the valve member 20 by the housing 50.

The rotational setting movement of the knob 56 also rotates the pinion 106 which drives the gear 96 and winds the mainspring 92 of the clock movement 80. The gear 100 tends to rotate with the gear 96 because of the frictional connection therebetween but it is prevented from doing so by the timer gear train 88 and escapement 86. Slippage therefore occurs between the gears 96 and 100. However, when the knob 56 is released, the torque of the main spring 92 is transmitted directly to the gear 96 and frictionally to the gear 100. Since the frictional torque between gears 96 and 100 is greater than the maximum torque of the mainspring 92, the mainspring torque will cause common rotation of the gears 96 and 100 as a unit. This rotation of gears 96 and 100 will drive the gear train 88 and the pinion 106, the escapement 86 controlling the speed of rotation and the pinion 106 causing return rotation of the shaft 54 and knob 56 to their initial angular positions.

When the mainspring 92 has rotated the shaft 54 to its initial angular position, the threads 58, 60 are disengaged from the threads 78 and, since the threads 58, 60 are then aligned with the recess 72, the shaft 54 will be moved rapidly to the right as viewed in Fig. 1 until the threads 58, 60 engage the bottom of the recess 74. Simultaneously, with this axial movement of the shaft 54, the valve member 32 will move into engagement with its seat 30 with a snap action to prevent further flow of fluid to the outlet 16 of the casing 10.

When the milled threads 58, 60 move into the recess 74, the flat sides 62 thereof parallel the side walls of the recess 74 and further rotation of the shaft 54 is prevented. The movement 80 will then stall and further unwinding of the mainspring 92 is prevented. Thus, the main spring 92 will never be permitted to run down and a substantial torque may be exerted thereby on the shaft 54 in all angular positions of the shaft to eliminate all danger of insufficient winding of the mainspring 92 when the timer is set to operate at a small time interval.

It is to be noted that since the thread portions 58, 60 are diametrically opposed portions of a double thread, they will engage and disengage the internal threads 78 simultaneously thereby preventing possible tilting and binding of the shaft 54.

If it is desired to eliminate control of fluid flow by the timer 80, the knob 56 is depressed to move the threads 58, 60 into engagement with the threads 78 and it is then rotated in a direction opposite to the time setting direction to wedge the external threads 58, 60 in the thread cavity at its junction with the recessed element 66. Any operation of the clock movement 80 will then tend to force the threads 58, 60 further into the cavity and the shaft 54 will be maintained in its depressed position thereby holding the valve element 32 away from its seat 30.

Figure 8:
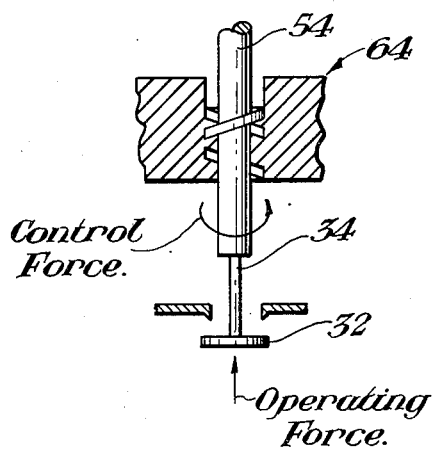
Fig. 8 is a schematic showing of a portion of the mechanism of Fig. 1.

It will be apparent that the hereinbefore described apparatus includes a novel detent mechanism wherein an operating force of considerable magnitude may be applied to a movable member and movement of such member under the influence of the operating force may be controlled by an extremely small control force. The detent mechanism comprises the threaded shaft 54 and internally threaded nut assembly 64, the pitch of the threads being selected to produce a frictional force equal and opposite to the torsional component of any axial thrust imposed upon the shaft 54. The control force in this instance is the torque applied to the shaft 54 by the clock movement 80 and is extremely small compared to the operating force applied axially of the shaft 54 by the valve biasing spring 42. This arrangement of the detent mechanism is shown schematically in Fig. 8 with the operating and control forces designated by arrows for the sake of simplicity.

Figure 9:
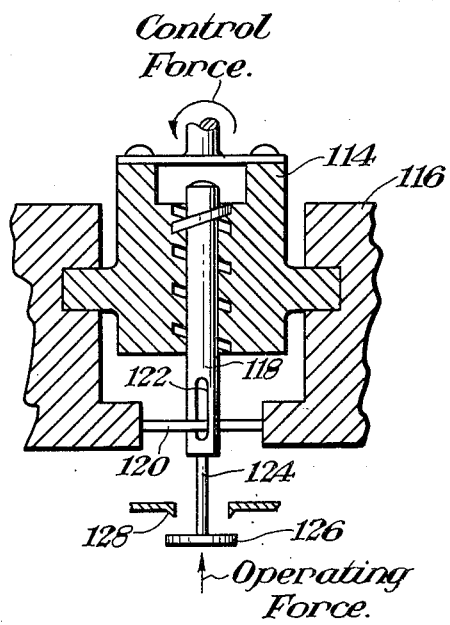
Fig. 9 is a schematic showing of another embodiment of the invention.
Figure 10:
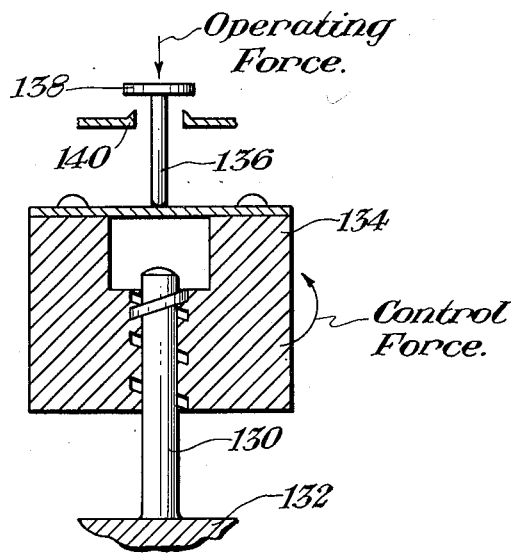
Fig. 10 is a schematic showing of another embodiment of the invention.
Figure 11:
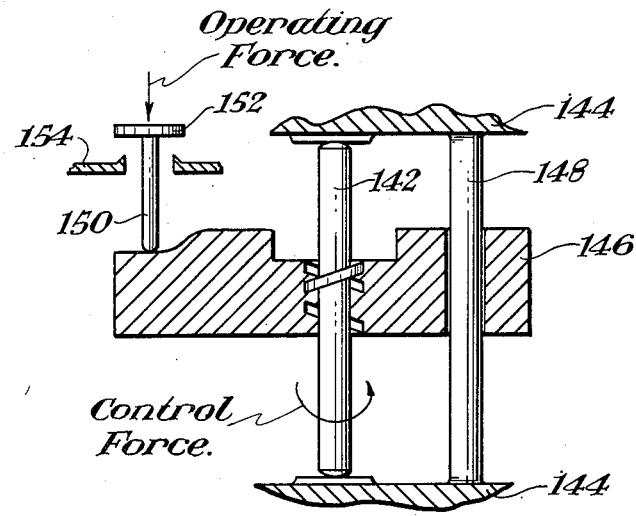
Fig. 11 is a schematic showing of still another embodiment of the invention.

Detent mechanisms embodying the principle of the hereinbefore described mechanism may take a variety of forms three of which are schematically illustrated in Figs. 9, 10 and 11.

In the apparatus illustrated in Fig. 9, a nut assembly 114 is mounted in a fixed bearing assembly 116 arranged to prevent axial movement of the nut 114. A longitudinally movable shaft 118 is threaded into the nut 114 and is restrained from rotational movement by a pin 120 secured to the bearing 116 and extending through an axial slot 122 formed in the pin 118. In engagement with the end of the shaft 118 is a valve stem 124 which carries a valve element 126 movable relative to a valve seat 128. The operating force is applied to the valve element 126 to urge the same toward the valve seat 128 and such force is transmitted through the valve stem 124 directly to the shaft 118. When the threads on the shaft 118 are in engagement with the threads of the nut 114, the operating force is transmitted through the shaft threads to the nut 114 to produce a reactive force including a torsional component resulting from friction. The pitch of the threads is selected to produce a helix angle the tangent of which is equal to the coefficient of friction of the thread surfaces. Accordingly, the torsional component of the operating force will be balanced by the torque resulting from friction and a minute control force may be applied to the nut to rotate the same and release the shaft 118 and valve 126 for movement under the operating force.

In the embodiment of Fig. 10, a threaded shaft 130 is fixed at one end to a stationary element 132 and a rotatable axially movable nut assembly 134 is threaded on the shaft 130. Bearing against the nut assembly 134 is a valve stem 136 which carries a valve element 138. The valve element 138 is biased toward a valve seat 140 by the operating force and such force is transmitted through the valve stem 136 to the nut 134 to impart an axial thrust thereto. The pitch of the threads in this embodiment is the same as the pitch of the threads in the embodiment of Figs. 8 and 9. The torque produced by the operating force is thus balanced by the action of friction between the threads and a minute control force may be applied to the nut 134 to rotate the same. After a given amount of rotation of the nut 134, the threads are disengaged and the nut 134 is released for axial movement under the influence of the operating force so that the valve element 138 is moved into engagement with the valve seat 140.

In the embodiment of Fig. 11, a threaded shaft is rotatably mounted between two stationary bearing structures 144. An axially movable nut assembly 146 is threaded on the shaft 142 and restrained from rotational movement by a pin 148 which is secured to the bearings 144 and which extends slidably through a suitable bore formed in the nut 146.

A valve stem 150 has one end in engagement with the nut 146 and carries on the other end thereof a valve element 152. The valve element 152 is biased toward a valve seat 154 by a suitable operating force and this force is transmitted through the valve stem 150 to the nut 146 to apply an axial thrust thereto. The pitch of the threads in this embodiment is the same as the pitch of the threads in the embodiments of Figs. 8, 9 and 10 and the torsional component of the axial thrust acting upon the nut 146 is therefore balanced by friction between the threads. Accordingly, a minute control force may be applied to the shaft 142 to rotate the same thereby disengaging the threads and freeing the nut 146 for axial movement under the influence of the operating force. Axial movement of the nut 146 after release of the same is accompanied by corresponding movement of the valve element 152 and the valve element 152 is moved into engagement with the valve seat 154.

It will be apparent from the foregoing that the illustrated embodiments provide new and improved control devices and accomplish the objects of the invention. It will also be obvious to those skilled in the art that the illustrated embodiments may be variously changed and modified, or features thereof, singly or collectively embodied in other combinations than those illustrated without departing from the scope of the invention or sacrificing all of the advantages thereof, and that accordingly the disclosures herein are illustrative only and the invention is not limited thereto.

I claim:

1. A control device comprising a first element adapted for longitudinal movement and having a bearing surface inclined relative to the direction of said movement, a second element having a surface adapted for frictional engagement with said bearing surface, means for exerting a force on said first element tending to impart said longitudinal movement thereto and slidable movement to said bearing surface relative to the other said surface, said bearing surface being inclined relative to the direction of said longitudinal movement the angle of said inclination being such that said frictional engagement is effective to produce a resistive force tending to prevent said slidable movement substantially balanced by the force tending to produce said slidable movement, and timing means operable on one of said elements for producing said slidable movement under predetermined conditions.

2. A control device as claimed in claim 1 wherein said surfaces are constructed and arranged to be disengaged upon occurrence of said slidable movement, said first member being freed for longitudinal movement when said surfaces are disengaged, and means for limiting said longitudinal movement.

3. In a control device, the combination comprising a rotatable member, a non-rotatable member, one of said members having an internally threaded aperture formed therein, the other of said members having an external thread formed thereon for engagement with said internal thread, means for applying a force to one of said members for transmission through said threads to the other of said members when said threads are interengaged, the helix angle of said threads being such that the torsional frictional component of the reactive force produced by the first said force is substantially balanced by the torsional component of said first force, and timing means for moving said members relative to each other for disengaging said threads and releasing the member to which said force is applied for movement by said force.

4. In a control device, the combination comprising a rotatable member, a non-rotatable member, one of said members having an internally threaded aperture formed therein, the other of said members having an external thread formed thereon for engagement with said internal thread, the helix angle of said threads being such that the tangent thereof is substantially equal to the coefficient of friction of the coacting surfaces of said threads, means for applying an axial force to one of said members, and timing means for rotating said rotatable member to thereby disengage said threads and release that member to which said force is applied for movement by said force.

5. In a control device, the combination comprising control means movable between a plurality of controlling positions, a member having an internally threaded aperture formed therein, a shaft having an external thread formed thereon for engagement with said internal thread, the helix angle of said threads being such that the tangent thereof is substantially equal to the coefficient of friction of the coacting surfaces of said threads, means for biasing said shaft to a position wherein said external thread is free of said internal thread, an operative connection between said shaft and said control means, means for moving said shaft against said bias to interengage said internal and external threads and move said control means to one of said controlling positions, and timing means for rotating said shaft for disengaging said threads and releasing said shaft for movement to the biased position thereof to move said control means to another of said controlling positions.

6. A control device comprising a first element adapted for longitudinal movement and having a bearing surface inclined relative to the direction of said movement, a second element having a surface adapted for frictional engagement with said bearing surface, means for exerting a force on said first element tending to impart said longitudinal movement thereto and slidable movement to said bearing surface relative to the other said surface, said bearing surface being inclined relative to the direction of said longitudinal movement at a predetermined angle such that the tangent thereof is substantially equal to the coefficient of friction of the coacting surfaces of said first and second elements, and timing means operable on one of said elements for producing said slidable movement under predetermined conditions.

7. A control device for flowable fluids comprising in combination a valve casing having inlet and outlet passages, a valve seat intermediate said passages, a valve member cooperable with said seat and movable between positions for controlling fluid flow between said passages, a valve stem operatively connected to said valve member, means for actuating said valve stem and moving said valve member between said positions, a second valve seat intermediate said passages, a second valve member movable toward and away from said second valve seat for controlling fluid flow between said passages, means for biasing said second valve member toward said second valve seat, an operating member extending through said valve stem and operatively associated with said second valve member for actuating the same, manually operable means including a threaded element for imparting axial movement to said operating member and moving said second valve member away from said second seat, detent means including a second threaded element positioned for frictional engagement with said first threaded element for producing a resistive force substantially equal to the force of said biasing means for holding said second valve member away from said second seat, said resistive force being produced in opposition to the force of said biasing means, and timing means for rotating one of said threaded elements to release said detent means and free said second valve member for movement to said biased position.

8. Control apparatus comprising in combination control means movable between controlling positions and biased to one of said positions, a threaded shaft positioned for axial and rotatable movement operatively associated with said control means for moving said control means against said bias to another control position when said shaft is moved to a first position, a relatively stationary threaded element positioned for threaded engagement with the first said shaft when said shaft is in said first position, spring operated timing means including a rotatable member, a torque transmitting connection between said rotatable member and said shaft for rotating said shaft to disengage said threads and free said shaft for axial movement to a second position wherein said control means is free to move to said biased position, and means for preventing rotation of said shaft during said axial movement thereof to said second position.

9. Control apparatus comprising control means movable between controlling positions and biased to one of said positions, means including a rotatable shaft axially movable and operatively associated with said control means for moving said control means against said bias to another controlling position when said shaft is moved from a first to a second axial position, detent means for holding said shaft in said second position, said detent means including an external thread formed on said shaft and an apertured member having an internal thread formed in a portion of said aperture, said shaft extending through said apertured member, manually operable means for moving said shaft axially against said bias from said first to said second positions and rotating said shaft to a third position to interengage said threads, and spring operated timing means for rotating said shaft from said third position to said second position to disengage said threads and release said shaft for axial movement under said bias to said first position to free said control means for movement to said one position, said external thread and the unthreaded portion of said aperture being non-circular in section for preventing rotation of said shaft except when said threads are interengaged.

10. Control apparatus comprising control means movable between controlling positions and biased to one of said positions, means including a shaft axially movable and operatively associated with said control means for moving said control means against said bias to another controlling position when said shaft is moved axially from a first to a second axial position, means for rotating said shaft to a third axial position beyond said second position, detent means for holding said shaft in said third position, said detent means including at least one pair of oppositely disposed segments of an external multiple thread formed on said shaft and an apertured member having an internal multiple thread formed in a portion of said aperture, said threads being inter-engageable to hold said shaft in said third position, and spring operated timing means for rotating said shaft to said second position to disengage said threads and release said control means for movement under said bias to said one position, the unthreaded portion of said aperture being non-circular in cross-section whereby the walls of said aperture are engageable by said thread segments to prevent rotation of said shaft when said threads are disengaged.

References Cited in the file of this patent

UNITED STATES PATENTS

| 945,556 | Lavigne | Jan. 4, 1910 |
| 1,482,798 | Kenney | Feb. 5, 1924 |
| 1,854,547 | Greenewalt | Apr. 19, 1932 |
| 1,896,904 | Laven | Feb. 7, 1933 |
| 2,193,972 | Lavenburg | Mar. 19, 1940 |
| 2,229,826 | Thornbery | Jan. 28, 1941 |
| 2,266,014 | Erickson | Dec. 16, 1941 |
| 2,347,201 | Lindsay | Apr. 25, 1944 |
| 2,454,887 | Schott | Nov. 30, 1948 |
| 2,543,032 | Laviana | Feb. 27, 1951 |
| 2,565,024 | Hill | Aug. 21, 1951 |
| 2,599,151 | Baldwin | June 3, 1952 |
| 2,610,683 | Beiser | Sept. 16, 1952 |

FOREIGN PATENTS

| 620,316 | Great Britain | Mar. 23, 1949 |